United States Patent [19]
Creegan et al.

[11] 3,914,484
[45] Oct. 21, 1975

[54] PRESSURE SENSITIVE ADHESIVE LABELS AND METHOD OF MAKING

[75] Inventors: Robert M. Creegan, Chelmsford; Daniel J. White, Framingham, both of Mass.

[73] Assignee: Dennison Manufacturing Company, Framingham, Mass.

[22] Filed: Feb. 24, 1971

[21] Appl. No.: 118,573

[52] U.S. Cl. .................. 428/42; 427/207; 428/40; 428/355; 260/858; 260/859 R
[51] Int. Cl. ...... B32b 7/08; G09f 3/10; B32b 27/40
[58] Field of Search ............... 260/858, 859, 859 R; 117/122 PA, 122 PB, 122 P; 161/190, 406, 39–40, 167

[56] References Cited
UNITED STATES PATENTS

| | | | |
|---|---|---|---|
| 3,085,903 | 4/1963 | Bemmels et al. | 117/122 P |
| 3,246,049 | 4/1966 | Webber | 117/122 PA |
| 3,356,635 | 12/1967 | Heer et al. | 117/122 PA |
| 3,427,366 | 2/1969 | Verdol et al. | 260/859 |
| 3,501,365 | 3/1970 | Marshall | 161/406 X |
| 3,515,773 | 6/1970 | Dahl | 117/122 PA |
| 3,519,525 | 7/1970 | Jackstadt | 161/406 X |
| 3,532,652 | 10/1970 | Zong et al. | 117/122 PA |
| 3,616,193 | 10/1971 | Lubowitz et al. | 161/190 |
| 3,671,301 | 6/1972 | Dahl | 117/122 PB |
| 3,706,626 | 12/1972 | Smith et al. | 161/406 X |
| 3,723,170 | 3/1973 | Korpman | 117/122 P |
| 3,756,848 | 9/1973 | Dahl | 117/122 PB |

*Primary Examiner*—Harold Ansher
*Attorney, Agent, or Firm*—George E. Kersey

[57] ABSTRACT

In a pressure sensitive adhesive label sheet stock in which the pressure sensitive adhesive layer (applied to a paper substrate) employs a normally non-tacky elastomer, such as natural or artificial rubber, and a normally tacky resin, such as an hydrogenated rosin ester, the improvement of replacing part but not all of the elastomer with a polyurethane elastomer, which has been cured on the substrate, as part of the elastomer system.

The polyurethane elastomer is formed from an organic polyol and an organic diisocyanate, which are present, as such, in the pressure sensitive adhesive coating composition when it is applied to the paper substrate. The polyol and diisocyanate are cured by heat while applied to the substrate during drying of the coating composition.

24 Claims, No Drawings

PRESSURE SENSITIVE ADHESIVE LABELS AND METHOD OF MAKING

SUMMARY OF INVENTION

In the conventional manufacture of pressure sensitive adhesive labels, the pressure sensitive adhesive, usually comprising a natural or synthetic rubber elastomer and a tacky resin, is applied as a solution to the substrate, usually paper, in the form of a continuous web and dried. Thereafter a release sheet, usually a silicone coated paper, also in the form of a continuous web, is applied to the exposed pressure sensitive adhesive surface to form a substrate-pressure sensitive adhesive-release sheet laminate.

Thereafter, the laminate web is slit in a slitter into strips, whereafter the substrate and adhesive layer, but not the release sheet, of each strip are cut into individual, spaced labels on the release sheet strip in a label forming rotary or flat bed press, whereafter the skeleton of substrate and pressure sensitive adhesive layer between and around the individual labels is stripped off the release sheet strip, which has not been cut, to leave a plurality (usually in one or more rows) of spaced labels mounted on the release sheet strip. In most cases, the margins between the edges of the release sheet strip and the corresponding edges of the labels adjacent thereto are cut out of the substrate and adhesive layer in the same operation. Such margins form part of the skeleton. In some cases, the release sheet may be perforated in the press operation. Also, in some cases, feed holes are punched into the laminated strip (through the substrate, adhesive layer and release sheet) along the margins before the stripping operation and in other cases holes are punched into the labels themselves. These operations, including the stripping step, are carried out in high speed machines.

Problems in the manufacture of conventional pressure sensitive adhesive label sheet stock in this way are as follows: it is difficult during high speed stripping of the cut-out skeleton from the release sheet strip to consistently obtain a clean separation between the removed skeleton and the remaining labels, i.e., the labels may be removed with the skeleton or the resistance of the labels to removal may cause the skeleton to break; it has been attempted to solve this problem by applying a special primer or tieing coat to the substrate before application of the adhesive layer thereto to obtain stronger bonding or anchorage of the adhesive layer to the substrate but this requires an added operation, which increases expense. Furthermore, during the cutting and punching operations, the adhesive tends to ooze at the cut and punch sites to thereby gum up the press and punch machinery, which creates maintenance problems and increases shut-down time. This oozing also deleterously effects the quality of the labels. Also, during cutting, stripping and punching strings of adhesive often form where the adjacent cut portions of the adhesive are separated from each other, which also tends to gum up the machinery and reduce the quality of the labels.

Other requirements in the manufacture of pressure sensitive adhesive labels are that the pressure sensitive adhesive compositions have a relatively long pot life, that the pressure sensitive adhesive be relatively temperature insensitive at processing temperatures and at the temperatures to which the labels are ordinarily subjected, that the pressure sensitive adhesive coating composition have a viscosity which will permit it to be conveniently handled and coated on the substrate with conventional coating techniques, that the pressure sensitive adhesive not discolor during label manufacture or during label storage and that it have good pressure sensitive adhesive properties.

The present invention provides a pressure sensitive adhesive label sheet stock and method for making the same, which minimize the aforesaid problems and meet the aforesaid requirements.

This is achieved in accordance with the invention by replacing part, but not all, of the normally non-tacky conventional elastomer used, e.g., natural and/or synthetic rubber, with a polyurethane elastomer of a polyol and a polyisocyanate (preferably diisocyanate) so that the resulting adhesive comprises the tacky resin and an elastomer base, which is made up of the conventional normally non-tacky elastomer or elastomers and the polyurethane elastomer.

The isocyanate and polyol are preferably present, as such, in the pressure sensitive adhesive coating composition applied to the substrate and are polymerized or cured to the solid polyurethane on the substrate, i.e., in situ, during drying by the application of higher temperatures than those usually employed in drying.

Although it is highly preferred to add the polyol and isocyanate to the coating composition so that they exist, as such, in the coating composition on the substrate when curing is commenced, they may be prepolymerized to some extent and the liquid prepolymer may be added to the coating composition, although the results are not as good, particularly where the substrate is paper. Furthermore, this requires the added step of prepolymerizing, which increases the cost, and the presence of the diisocyanate and polyol as a prepolymer is apt to reduce pot life of the coating composition because of the tendency of the prepolymer to gel. Also, when the diisocyanate and polyol are added as a prepolymer, rather than as such, this decreases the availability of the diisocyanate for bonding with the cellulosic hydroxyl groups of the paper substrate, as will be described more fully hereinafter, which may reduce bond strength between the adhesive and the substrate. Most of the advantages of the invention are lost if a fully polymerized polyurethane is added to the coating composition.

When the diisocyanate is present, as such, in the coating composition at the commencement of curing on the substrate, it is believed that it chemically reacts or hydrogen bonds during curing with the free cellulosic OH groups of the paper at the paper substrate surface to form a chemical bond between it and the paper. Of course, during the same curing the diisocyanate also chemically reacts with the OH groups of the polyol to form the polyurethane elastomer mass. Accordingly, this provides a very strong bond and anchorage between the paper and the adhesive layer, i.e., the adhesive is self priming. This insures a consistently clean break between the removed skeleton and the remaining labels during high speed stripping, improves the dye punch and cutting properties of the label sheet stock, reduces oozing and stringing, reduces gumming up of the press and punch machinery and reduces maintenance and shut-down time. When the diisocyanate and polyol are added as a prepolymer, this effect may be reduced somewhat and when they are added as a fully cured or polymerized polymer, there is no such effect or it is minimal.

The polyurethane in the dried and cured pressure sensitive adhesive layer of the present invention is preferably incompletely polymerized or cured, as evidenced by the fact that it is relatively soluble in organic solvents in which completely cured or polymerized polyurethane is relatively insoluble.

Preferably, the polyol is present in the coating composition in excess of stoichiometric amount for complete reaction, i.e., for complete curing, with the diisocyanate, i.e., an NCO/OH molar ratio of less than 1.0, e.g., between 0.6 and 0.9. However, the CNO/OH ratio can be unity or near unity under other conditions which bring about incomplete curing.

Although some of the advantages of the invention are achieved when the polyurethane in the final adhesive is fully cured so long as it is cured in situ on the substrate, as distinguished from being added to the coating composition as a fully cured polyurethane, and so long as there is a substantial amount of conventional non-polyurethane elastomer present as a diluent, nevertheless, the results are not as good as when the polyurethane in the final adhesive coating is incompletely cured.

A highly preferred polyol is a polyol polymer having a repeating backbone group corresponding to the repeating backbone groups of the conventional elastomers used in pressure sensitive adhesives, which backbone groups impart the elastomeric properties both to such conventional elastomers and to the polyurethane elastomer. Preferably, the repeating elastomer-imparting backbone group of the polyol polymer is the same as the repeating elastomer-imparting backbone group of the non-polyurethane elastomer present in the adhesive. The most preferred polyols are the liquid hydroxy-terminated diene polymers, i.e., butadiene polymers, including the diene (butadiene) homopolymers, the diene-styrene (butadiene-styrene) copolymers and the diene-acrylonitrile (butadiene-acrylonitrile) copolymers, all of which have allylic hydroxy groups. Polyurethane elastomers made from these polyols are described in U.S. Pat. No. 3,427,366. Formulations thereof with other elastomers are also described in this patent. Thus, it is preferred, for example, to use with a butadiene-styrene rubber, as one of the non polyurethane elastomers, a polyurethane made from a hydroxy-terminated butadiene-styrene copolymer. By the same token, if a polyisobutylene or polyisoprene rubber is used as a non-polyurethane elastomer then a polyurethane made from a hydroxyl-terminated polyisobutylene or polyisoprene is preferred to maximize the compatibility of the polyurethane and non-polyurethane elastomers. Not only does this maximize compatibility but also it is believed that, for example with respect to a butadiene-styrene rubber used with a polyurethane made from butadiene-styrene polyol, there are a limited number of available double bonds in the butadiene-styrene rubber for reaction with the conjugated double bonds of the butadiene-styrene polyol to achieve some bonding between the polyurethane and non-polyurethane elastomers, which increases the cohesiveness of the adhesive and, hence, together with the increased bonding effect between adhesive and substrate, increases the aforesaid anchoring effect of the whole adhesive layer to the substrate and reduces oozing and stringing.

However, other polyols, such as the polyethers, polyhydroxyl polyesters, ethylene or propylene oxide adducts of polyols, polypropylene glycols, polyalklyene ether glycols, polyhydroxy polyalkylene ethers, etc. can be used with, or instead of, the hydroxyl-terminated polymers referred to above. But, if they are used instead of such hydroxyl-terminated polymers, the results are not as good and non-compatibility of the polyurethane and non-polyurethane elastomers may become a problem.

A preferred polyisocyanate is a high molecular weight aryl diisocyanate which is relatively non-volatile. Aryl or aromatic diisocyanates having two or more benzene rings, i.e., polyaryls, such as the diphenyl diisocyanates, e.g., diphenyl methyl p-diisocyanate, have these properties. However, any of the polyisocyanates (aryl, cyclo-aliphatic and aliphatic), preferably the diisocyanates, conventionally used in making polyurethane can be used, such as the m- and p-phenylene diisocyanates, octamethylene diisocyanate, hexamethylene diisocyanate, 1,5 naphthalene diisocyanate, 4-4-diphenyl isocyanate, polymethylenepolyphenyl diisocyanate, octamethylene diisocyanate, 3,3'-dimethoxy-4,4'-biphenyl diisocyanate, polyisocyanate-terminated polymers, e.g., diisocyanate-terminated poly ethers or polyesters, etc. Although tolylene diisocyanate can be used, it is volatile and hence is not preferred.

The non-polyurethane, normally non-tacky elastomers may be of any of those conventionally used in pressure sensitive adhesives, such as natural rubber, synthetic rubber, butadiene-styrene rubbers, polyisobutylene rubbers, isopolybutadiene rubbers, ethylene-propylene terpolymer rubbers, polyacrylic rubbers, polyvinyl ether rubbers, butadiene-acrylonitrile rubbers, butadiene-styrene-acrylonitrile rubbers, butyl rubbers, etc. Preferably, the non-polyurethane elastomer should not contain halogens, such as chlorine, since the chlorine may be harmful to the paper. For the same reason, it is preferred that the tackifying resin and polyurethane not contain halogens.

Any of the tacky or tackifying resins conventionally used in pressure sensitive adhesives can be used in the present invention, such as the rosin esters, hydrogenated rosin esters, the glycerol ester of hydrogenated rosin, the polyterpene resins, the coumaroneindene resins, crude rubber, polyisobutylene and other unsaturated hydrocarbon resins, phenolated terpene, petroleum resins, etc.

It is also preferred to include in the pressure sensitive adhesive compositions a polyol modifier or modifiers to promote hydrogen bonding between the diisocyanate groups and the hydroxyl groups such as a short chain diol or triol, e.g., N,N Bis [2-hydroxy propyl] aniline, 1,2-propanediol, 1,3-propanediol, 1,4-butane diol, 2,3-butane diol, 2-butene diol -1,4,1,5-pentanediol, 1,6-hexanol diol, 2-methyl, 2-ethyl-1,3-propane diol, 1,2,6hexane triol.

The amount of tacky resin may range between 30 and 70%, more preferably between 40 and 60%, by weight of the total dry weight of the adhesive.

In terms of the elastomer base, which includes the non-polyurethane elastomer or elastomers and the polyurethane elastomer, the ratio by weight of tacky resin to elastomeric base may range between 1:2 and 2:1, more preferably between 2:3 and 3:2 with a ratio of about 1:1 being preferred.

The amount of polyurethane elastomer may range between 10 and 90%, preferably 30–60%, by weight of the total elastomer base, i.e., the polyurethane elastomer and the non-polyurethane elastomer or elastomers. Best results have been achieved, however, when the amount of polyurethane elastomer is less than the amount of nonpolyurethane elastomer or elastomers, i.e., a weight ratio of less than 1:1, preferably between 1:3 and 9:11 and more preferably between 1:3 and 2:3.

When a modifying polyol is added the amount may vary over a wide range depending on the modification desired, e.g., between 5–30%, preferably between 10–25%, by weight of the polyurethane.

Anti-oxidants, fillers and other additives conventionally used in pressure sensitive adhesive formulations can also be incorporated.

The substrate and release sheet may be any of those conventionally used in pressure sensitive label sheet stock but a paper substrate is preferred and a silicone coated paper is preferred as a release sheet.

The diisocyanate and polyol in the pressure sensitive adhesive coating applied to the substrate are preferably incompletely cured to a solid polyurethane on the paper substrate by the heat used in drying the coated paper, as aforesaid, preferably at a temperature of between 200°–350°F, more preferably between 250°–300°F. The curing increases the cohesiveness and plasticity of the adhesive to that of conventional pressure sensitive adhesives, i.e., it changes from a typically liquid state to a typically solid state.

Although conventional polyurethane curing catalysts can be used, it is preferred not to use them. When they are used curing time and temperature may be reduced.

Adhesive tapes using polyurethane resins in pressure sensitive adhesives also containing tacky resins are suggested in U.S. Pat. Nos. 3,437,622 and 3,246,049, but in each case, the adhesive system does not also include conventional non-polyurethane elastomers and the polyurethane is substantially fully cured, as evidenced by its relative solvent resistance, i.e., these systems are total fully cured polyurethane systems. The use in the manufacture of pressure sensitive labels of polyurethane alone as the elastomer base without dilution with other conventional elastomers has the following disadvantages: poor pot life, difficulty in obtaining proper coating viscosities for properly coating the substrate with existing commercial coating equipment, serious discoloration problems, poor formulation versatility and relatively poor pressure sensitive adhesiveness for pressure sensitive labeling purposes, as distinguished from adhesive tapes. Furthermore, it is necessary to add the polyurethane to the coating composition either as a prepolymer, which is an added expense and results in poor pot life, or as a fully cured polymer which does not substantially strengthen the adhesive-substrate bond; otherwise, it would be impossible to achieve proper coating viscosity. Furthermore, the presence of substantially fully cured polyurethane without dilution with other rubber elastomers conventionally used in pressure sensitive adhesives, provides a label stock with poor processing (press, cutters and punches) properties during formation of the labels from the label stock.

U.S. Pat. No. 3,356,635 discloses an adhesive tape containing a relatively expensive chlorine-containing elastomer, a fully cured polyurethane gum and a chlorine-containing tackifying resin to provide a fire-resistant and oil-resistant adhesive tape. The fully cured solid polyurethane solids are milled with the chlorine-containing elastomer solids and added to the tacky resin and solvent to form the coating composition which is applied to a backing sheet. This technique does not substantially increase the adhesive-substrate bond strength.

DETAILED DESCRIPTION

EXAMPLE I 70 lbs. of styrene-butadiene rubber are dissolved in 217 lbs. in toluene to form a 15% solution.

150 lbs. of solid FORAL sold under that name by Hercules Inc. and which is a stabilized and modified hydrogenated rosin derivative (tacky-resin) is added to the rubber solution with stirring.

42 lbs. of liquid hydroxy-terminated styrene-butadiene polymer sold by Sinclair Petrochemicals Inc. under the name Poly B-D CS-15 (between 2 and 3 hydroxyl groups per molecule) is added to the solution with stirring.

0.67 lbs. of an antioxidant (SANTOVAR A) is then added to the solution with stirring.

6 lbs. of liquid diphenyl methyl p-diisocyanate sold under the name ISONATE 143L by Upjohn is then added to the solution with stirring.

The resulting pressure sensitive adhesive coating composition (between 8,000–20,000 centipoises) is continuously coated (7–15 lbs. per 20 × 25 500 sheet ream of paper) on a conventional pressure sensitive adhesive label paper web (substrate) of conventional thickness, namely, KROMECOTE sold by Champion Paper Company under that name.

The coated paper web is continuously dried in a drying oven at 250°F for approximately 30 seconds to 2 minutes, which also cures the polyurethane on the paper substrate to a solid polymer, to provide the pressure sensitive adhesive paper label stock.

Thereafter, a web of conventional silicone coated release paper, i.e., a 50 lb. Deerfield Release Paper sold by Deerfield Paper Company, is continuously applied to the exposed surface of the pressure sensitive adhesive layer (with the silicone coating in contact with the adhesive) to provide a paper-adhesive-release paper laminate web.

Thereafter, the laminate web is slit into strips in a conventional label stock slitting machine and the label paper and adhesive layers of each strip are cut into individual, spaced labels on the release sheet strip in conventional pressure sensitive adhesive label forming presses with the skeleton of the label paper and adhesive layers between and around the individual cut-out labels being stripped off the release sheet at a high speed in conventional manner to leave the individual spaced labels releasably adhered to and on the release sheet strip, followed by rolling the strips of labels into rolls and packaging.

During formation of the labels, two rows of feed holes may be punched at the margins of the laminate strips by conventional punches before stripping off the skeleton, with the marginal portions of the label paper and adhesive, in which the holes are punched, being stripped off with the skeleton.

High speed stripping is excellent and much improved over the use of a conventional pressure sensitive adhesive label stock using the same pressure sensitive adhesive except for omission of the polyols and diisocyanate, i.e., these are replaced with polybutadienestyrene rubber. There is a consistently good clean break between the removed skeleton and the remaining labels during stripping to thereby reduce rejects and breakdown. Also, shear is improved with less and shorter stringing and the punch properties are improved with less oozing at the cuts and holes. Because of the reduction in oozing and stringing and the consistent cleanness of the break between skeleton and labels, the machines do not gum up as fast and skeleton breakage and label lifting are reduced with substantial reduction in maintenance and down time of the machines.

The adhesive layer is self priming in that it does not require a priming or tie-on coat on the label paper before application of the pressure sensitive adhesive layer in order to achieve good stripping.

The pressure sensitive adhesive properties are as good as the conventional label stock so that the improvements in processing of the label stock are obtained without sacrifice in pressure sensitive adhesive quality.

Furthermore, the adhesive has an excellent pot life (4 days with no gelling), good heat stability and is relatively insensitive to temperature within the range of temperatures to which pressure sensitive adhesive labels and label stock are customarily subjected.

Good coating viscosity is achieved with no problem and substantial versatility in formulation can be achieved.

EXAMPLE II

Same as Example I except 10 lbs. of Poly BD CS-15 is replaced with Sinclair Petrochemicals Inc.'s Poly BD 45M, which is a hydroxy-terminated butadiene homopolymer (allylic hydroxy groups). The results are about the same.

A search of the prior art revealed the following U.S. Pats. and publications and one Canadian Patent, none of which disclose an incompletely cured-on-the paper polyurethane elastomer as only a portion of the total elastomer in an elastomer-tacky resin pressure sensitive adhesive system:

U.S. Patents

| | |
|---|---|
| 2,877,212 | 3,356,635 |
| 3,338,861 | 3,427,366 |
| 2,886,467 | 3,316,189 |
| 3,085,903 | 2,653,880 |
| 3,251,713 | 2,858,287 |
| 3,012,987 | 3,197,330 |
| 3,089,786 | 3,246,049 |
| 3,102,102 | 3,248,254 |
| 3,135,708 | 3,311,527 |
| 3,136,733 | 3,431,235 |
| 3,164,439 | 3,475,378 |
| 3,437,622 | |

Product Data Bulletins Numbers 505 (Revised June 1967) and 506 (August 1967) by Sinclair Petrochemicals Inc., 600 Fifth Ave., New York, N.Y., entitled Poly B-D Liquid Resins Canadian Pat. No. 711,324

The aforesaid description and examples are given by way of example and it is not intended that the invention be limited thereto or to any theory advanced but only to the products and methods described in the following claims and their equivalents.

We claim:

1. Pressure sensitive adhesive label sheet stock comprising a layer of pressure sensitive adhesive adhered to a substrate, said pressure sensitive adhesive comprising an elastomer base and a tackifying resin, said elastomer base consisting essentially of a blend of a solid polyurethane elastomer cured on the substrate and one or more normally non-tacky elastomers other than polyurethane elastomer, said polyurethane elastomer being a copolymer of a polyol and an isocyanate which have been applied to said substrate in admixture with said tackifying resin and said one or more non-tacky elastomers without first subjecting them to prepolymerizing temperatures to substantially prepolymerize them and which have been cured in situ on said substrate in the presence of said tackifying resin and said one or more normally non-tacky elastomers, said one or more non-tacky elastomers being selected from the group consisting or natural and synthetic rubbers.

2. Pressure sensitive adhesive label sheet stock according to claim 1, said polyurethane and said one or more elastomer components together comprising between 30% and 70% by weight of the pressure sensitive adhesive, said tackifying resin comprising between 30% and 70% by weight of the pressure sensitive adhesive and said polyurethane comprising between 10% and 90% by weight of the elastomer base.

3. Pressure sensitive adhesive label sheet stock according to claim 1, said synthetic rubber being selected from the group consisting of styrene-butadiene copolymer, butadiene-acrylonitrile copolymer, butadiene-styrene-acrylonitrile copolymer, polyisoprene, isopolybutadiene, polyisobutylene, ethylene-propylene terpolymer, acrylic resin, poly-vinyl ethers, and butyl rubber.

4. Pressure sensitive adhesive label sheet stock according to claim 1, said tackifying resin being selected from the group consisting of hydrogenated rosin esters, coumarone-indene resins, unsaturated aliphatic hydrocarbons, polyterpene, polyisobutylene, phenylated terpene and petroleum resins.

5. Pressure sensitive label sheet stock according to claim 1, said polyurethane being the polyurethane of a polyisocyanate and an organic polyol polymer having an elastomeric-imparting, repeating backbone structure derived from olefinic polymerization.

6. Pressure sensitive adhesive label sheet stock according to claim 5, said polyol polymer being a hydroxy-terminated diene polymer.

7. Pressure sensitive adhesive label sheet stock according to claim 6, said hydroxy-terminated diene polymer being selected from the group consisting of butadiene homopolymer, butadiene-acrylonitrile copolymer, butadiene-styrene copolymer, butadiene-styrene-acrylonitrile copolymer and mixtures thereof.

8. Pressure sensitive adhesive label sheet stock according to claim 1, said polyurethane being the polyurethane of a diisocyanate and an organic polyol polymer having an elastomeric-imparting, repeating backbone structure which is substantially the same as the elastomeric-imparting, repeating backbone structure of at least one of said one or more elastomers.

9. Pressure sensitive adhesive label sheet stock according to claim 8, said polyol polymer being a polyol butadiene polymer and said one or more elastomers including a butadiene polymer.

10. Pressure sensitive adhesive label sheet stock according to claim 1, said polyurethane being a polyurethane of a diisocyanate and a polyol butadiene polymer and another modifying polyol selected from the group consisting of a non-polymeric diol and a triol to promote hydrogen bonding.

11. Pressure sensitive adhesive label sheet stock according to claim 1, having a release sheet releasably adhered to the exposed layer of pressure sensitive adhesive to protect it, the ratio of polyurethane elastomer to non-polyurethane elastomer being less than 1:1.

12. Pressure sensitive adhesive label sheet stock according to claim 1, said polyurethane being an incompletely polymerized polyurethane.

13. Pressure sensitive adhesive label sheet stock according to claim 1, said polyurethane being a polyurethane of a polyol and a polyisocyanate, the amount of polyol being greater than the stoichiometric amount for complete polymerization with said polyisocyanate.

14. A plurality of individual pressure sensitive adhesive labels, each comprising a layer of pressure sensitive adhesive adhered to a substrate, said plurality of labels being releasably mounted by their pressure sensitive layers on a release sheet in spaced relation with respect to each other, said pressure sensitive adhesive comprising an elastomer base and a tackifying resin, said elastomer base consisting essentially of a blend of a polyurethane elastomer and one or more normally non-tacky elastomers other than polyurethane, said polyurethane elastomer being a copolymer of a polyol and an isocyanate which have been applied to said substrate in admixture with said tackifying resin and said one or more non-tacky elastomers without first subjecting them to prepolymerizing temperatures to substantially prepolymerize them and which have been cured in situ on said substrate in the presence of said tackifying resin and said one or more normally non-tacky elastomers, said one or more non-tacky elastomers being selected from the group consisting of natural and synthetic rubbers.

15. A plurality of labels according to claim 14, said polyurethane being a polyurethane of a non-volatile diisocyanate and a hydroxy terminated butadiene polymer, the ratio of said polyurethane to said one or more elastomeric components other than polyurethane being between 2:3 and 1:3 and the ratio of tackifying resin to elastomer base being between 1:2 and 2:1.

16. Pressure sensitive adhesive label sheet stock comprising a paper substrate having adhered thereto a coating of pressure sensitive adhesive comprising an elastomeric base and a tackifying resin, said elastomeric base consisting essentially of a blend of solid polyurethane elastomer, formed from a polyisocyanate and a polyol, and one or more normally non-tacky elastomers other than polyurethane elastomer, said polyurethane being chemically bonded to said substrate to thereby firmly anchor said pressure sensitive adhesive coating to said substrate by curing said polyisocyanate and polyol in situ on said substrate from a substantially non-prepolymerized state and in the presence of said tackifying resin and said one or more non-tacky elastomers other than polyurethane, said one or more non-tacky elastomers being selected from the group consisting of natural and synthetic rubber.

17. Pressure sensitive adhesive label sheet stock according to claim 16, said one or more elastomers being chemically bonded to said polyurethane by curing said polyisocyanate and polyol in situ on said substrate from a substantially non-prepolymerized state.

18. Pressure sensitive adhesive label sheet stock according to claim 16, said polyol being a hydroxy-terminated polydiene.

19. A method of making pressure sensitive adhesive label stock comprising coating on a substrate a pressure sensitive adhesive coating composition composed of a liquid solution of a tackifying resin and an elastomer other than a polyurethane elastomer and containing organic polyol and isocyanate which have not been previously subjected to prepolymerizing temperatures but which are polymerizable to an elastomeric polyurethane, drying said applied coating and curing said polyol and diisocyanate to said elastomeric polyurethane while applied to said substrate and in the presence of said tackifying resin and said elastomer other than polyurethane elastomer.

20. A method according to claim 19, said polyurethane being incompletely polymerized.

21. A method according to claim 19, the amount of polyol being greater than the stoichiometric amount for complete polymerization with said polyisocyanate.

22. A method according to claim 19, said polyurethane and said elastomer other than polyurethane both having substantially the same elastomeric-imparting repeating backbone structure.

23. A method according to claim 19, said polyol being a hydroxy-terminated diene polymer.

24. A method according to claim 23, said elastomer other than polyurethane including a diene polymer.

* * * * *